(12) United States Patent
Hwang et al.

(10) Patent No.: US 9,583,781 B2
(45) Date of Patent: Feb. 28, 2017

(54) MULTIPLE CONDUCTIVE TABS FOR FACILITATING CURRENT FLOW IN BATTERIES

(71) Applicant: Apple Inc., Cupertino, CA (US)

(72) Inventors: Taisup Hwang, Santa Clara, CA (US); Richard M. Mank, Cupertino, CA (US); Bookeun Oh, Fremont, CA (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 13/869,242

(22) Filed: Apr. 24, 2013

(65) Prior Publication Data

US 2014/0322575 A1    Oct. 30, 2014

(51) Int. Cl.
*H01M 10/04* (2006.01)
*H01M 2/02* (2006.01)
*H01M 2/26* (2006.01)

(52) U.S. Cl.
CPC ....... *H01M 10/0431* (2013.01); *H01M 2/0275* (2013.01); *H01M 2/26* (2013.01); *H01M 2220/30* (2013.01); *Y10T 29/4911* (2015.01)

(58) Field of Classification Search
CPC ..... H01M 2/0275; H01M 2/26; H01M 10/031
See application file for complete search history.

(56) References Cited

U.S. PATENT DOCUMENTS

| 6,103,424 A * | 8/2000 | Hamamatsu et al. ........ 429/233 |
| 2011/0129707 A1* | 6/2011 | Ahn .................... H01M 2/22 |
| | | 429/94 |
| 2011/0183169 A1* | 7/2011 | Bhardwaj et al. .............. 429/94 |

* cited by examiner

*Primary Examiner* — Ladan Mohaddes
(74) *Attorney, Agent, or Firm* — Polsinelli PC

(57) ABSTRACT

The disclosed embodiments provide a battery cell. The battery cell includes a set of layers which are wound together to form a jelly roll, including a cathode with an active coating, a separator, and an anode with an active coating. The battery cell also includes a pouch enclosing the layers, wherein the pouch is flexible. To increase a current flow in the battery cell, a first set of conductive tabs is coupled to a cathode substrate of the cathode, and a second set of conductive tabs is coupled to an anode substrate of the anode.

16 Claims, 6 Drawing Sheets

MULTIPLE CONDUCTIVE TABS FOR FACILITATING CURRENT FLOW IN BATTERIES

BACKGROUND

Field

The disclosed embodiments relate to batteries for portable electronic devices. More specifically, the disclosed embodiments relate to the coupling of multiple conductive tabs to each electrode of a battery cell to facilitate current flow in the battery cell.

Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing jelly rolls of wound electrodes and electrolyte in an aluminized laminated pouch. Multiple pouches may then be placed side-by-side within a portable electronic device and electrically coupled in series and/or in parallel to form a battery for the portable electronic device.

However, wound battery cell structures such as jelly rolls may have high internal resistances that preclude efficient current distribution and/or flow during high transient discharge currents. For example, a pulse discharge of a lithium-polymer battery cell containing a jelly roll may cause a significant voltage drop in the battery cell and/or an imbalance in the internal current distribution of the battery cell. In turn, the full discharge capacity of the battery cell may not be utilized. For example, a −4 C pulse discharge of a lithium-polymer battery cell may cause the voltage of the battery cell to drop below a 2.8V discharge-termination voltage for the battery after only 67% of the battery cell's capacity is used.

Consequently, use of wound battery cell structures may be facilitated by mechanisms for improving the transient voltage responses of the battery cell structures to high transient discharge currents.

SUMMARY

The disclosed embodiments provide a battery cell. The battery cell includes a set of layers which are wound together to form a jelly roll, including a cathode with an active coating, a separator, and an anode with an active coating. The battery cell also includes a pouch enclosing the layers, wherein the pouch is flexible. To increase a current flow in the battery cell, a first set of conductive tabs is coupled to a cathode substrate of the cathode, and a second set of conductive tabs is coupled to an anode substrate of the anode.

In some embodiments, each set of conductive tabs from the first and second sets of conductive tabs is electrically connected within the pouch.

In some embodiments, at least one conductive tab from each of the first and second sets of conductive tabs extends through seals in the pouch to provide terminals for the battery cell.

In some embodiments, each set of conductive tabs from the first and second sets of conductive tabs is electrically connected outside the pouch.

In some embodiments, the first and second sets of conductive tabs include a first conductive tab extending through a first side of the battery cell and a second conductive tab extending through a second side of the battery cell.

In some embodiments, the second side is opposite the first side.

In some embodiments, each set of conductive tabs from the first and second sets of conductive tabs includes a first conductive tab coupled to a first end of an electrode substrate and a second conductive tab coupled to a second end of the electrode substrate.

In some embodiments, the active coating is omitted from one or more portions of the cathode and anode substrates, and the first and second conductive tabs are coupled to the one or more portions.

In some embodiments, the active coating is omitted from the substrates using at least one of a mask, a solvent, and a pattern-coating technique.

In some embodiments, the first and second sets of conductive tabs are coupled to the cathode and anode substrates using a welding technique.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
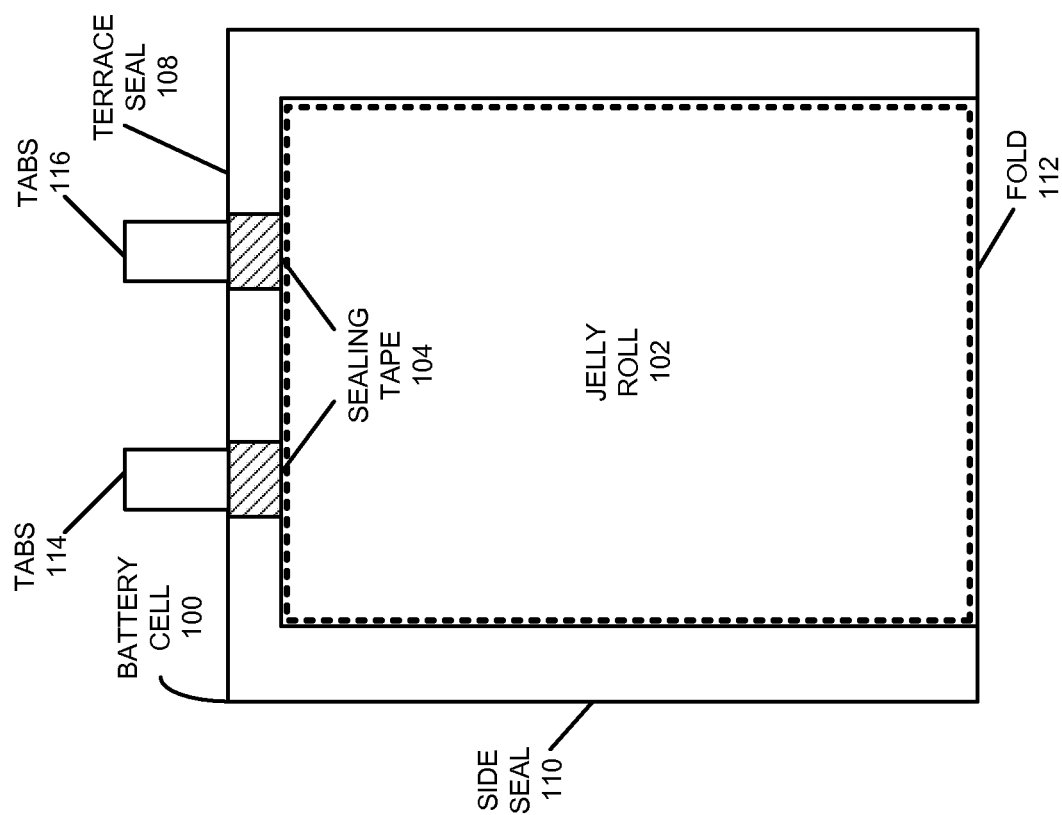
FIG. 1 shows a battery cell in accordance with the disclosed embodiments.

FIG. 1 shows a top-down view of a battery cell 100 in accordance with an embodiment. Battery cell 100 may correspond to a lithium-polymer cell that is used to power a portable electronic device. For example, battery cell 100 may be used in a battery pack that supplies power to components of a portable electronic device such as a laptop computer, tablet computer, mobile phone, portable media player, and/or digital camera.

Battery cell 100 includes a jelly roll 102 containing a number of layers which are wound together, including a cathode with an active coating, a separator, and an anode with an active coating. More specifically, jelly roll 102 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure. Jelly rolls are well known in the art and will not be described further.

During assembly of battery cell 100, jelly roll 102 is enclosed in a flexible pouch, which is formed by folding a flexible sheet along a fold line 112. For example, the flexible sheet may be made of aluminum with a polymer film, such as polypropylene. After the flexible sheet is folded, the flexible sheet can be sealed, for example, by applying heat along a side seal 110 and along a terrace seal 108.

Jelly roll 102 also includes conductive tabs 114-116 coupled to the cathode and the anode. Conductive tabs 114-116 may extend through terrace seal 108 (for example, formed using sealing tape 104) to provide terminals for battery cell 100. Conductive tabs 114-116 may then be used to electrically couple battery cell 100 with one or more other battery cells to form a battery pack. For example, the battery pack may be formed by coupling the battery cells in a series, parallel, or series-and-parallel configuration.

In one or more embodiments, multiple conductive tabs 114-116 are connected to both the cathode and anode to facilitate current flow in battery cell 100. More specifically, a first set of conductive tabs 114 may be coupled to a cathode substrate of the cathode, and a second set of conductive tabs 116 may be coupled to an anode substrate of the anode. At least one conductive tab from each set of conductive tabs 114-116 may extend through seals (e.g., side seal 110, terrace seal 108) to provide terminals for battery cell 100. The increased current flow may improve the transient voltage response of battery cell 100 to pulse discharges and/or other types of high discharge currents, as discussed in further detail below.

Figure 2:
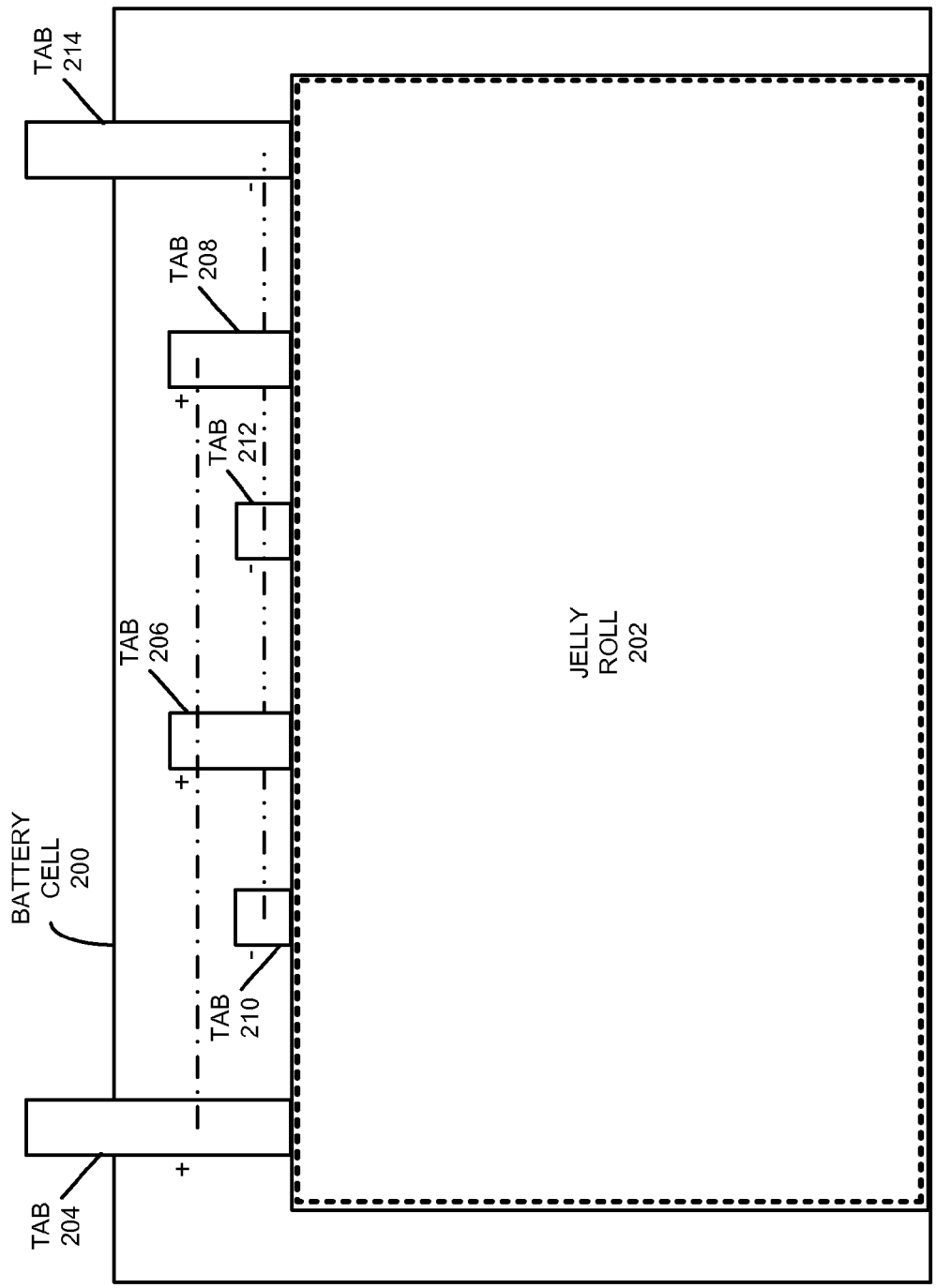
FIG. 2 shows a battery cell in accordance with the disclosed embodiments.

FIG. 2 shows a battery cell 200 in accordance with the disclosed embodiments. As shown in FIG. 2, battery cell 200 includes a jelly roll 202 and multiple conductive tabs 204-214 coupled to jelly roll 202. In particular, a cathode of jelly roll 202 may be coupled to a first set of conductive tabs 204-208, and an anode of jelly roll 202 may be coupled to a second set of conductive tabs 210-214.

In addition, conductive tabs 204-208 may be electrically connected to one another within the pouch for battery cell 200, and conductive tab 204 may extend through a seal in the pouch to provide a positive terminal for battery cell 200. Conductive tabs 210-214 may also be electrically connected to one another within the pouch, and conductive tab 214 may extend through the seal to provide a negative terminal for battery cell 200. The extension of a single conductive tab through the pouch to provide each terminal of battery cell 200 may allow battery cell 200 to maintain the same appearance as a battery cell containing only one conductive tab for each of the cathode and the anode.

On the other hand, the coupling of multiple conductive tabs 204-214 to each electrode of battery cell 200 may increase the current flow within battery cell 200 and/or reduce the internal resistance of battery cell 200. For example, conductive tabs 204-208 may be spaced along an unrolled sheet of aluminum foil for a cathode of jelly roll 202, and conductive tabs 210-214 may be spaced along an unrolled sheet of copper foil for an anode of jelly roll 202. The spacing of conductive tabs 204-208 and 210-214 along the unrolled sheets of cathode and anode, respectively, may reduce the "distance" traveled by current within the cathode and anode during charging and/or discharging of battery cell 200.

Conductive tabs 204-214 may also be positioned to facilitate the manufacturing of battery cell 200. For example, each set of conductive tabs 204-214 may be coupled to portions of the cathode and anode so that each set of conductive tabs is aligned after the cathode and anode are wound to create jelly roll 202. In turn, the aligned sets of conductive tabs 204-214 may be electrically connected inside the pouch using a crimping technique, welding technique, and/or wire-bonding technique.

Figure 3:
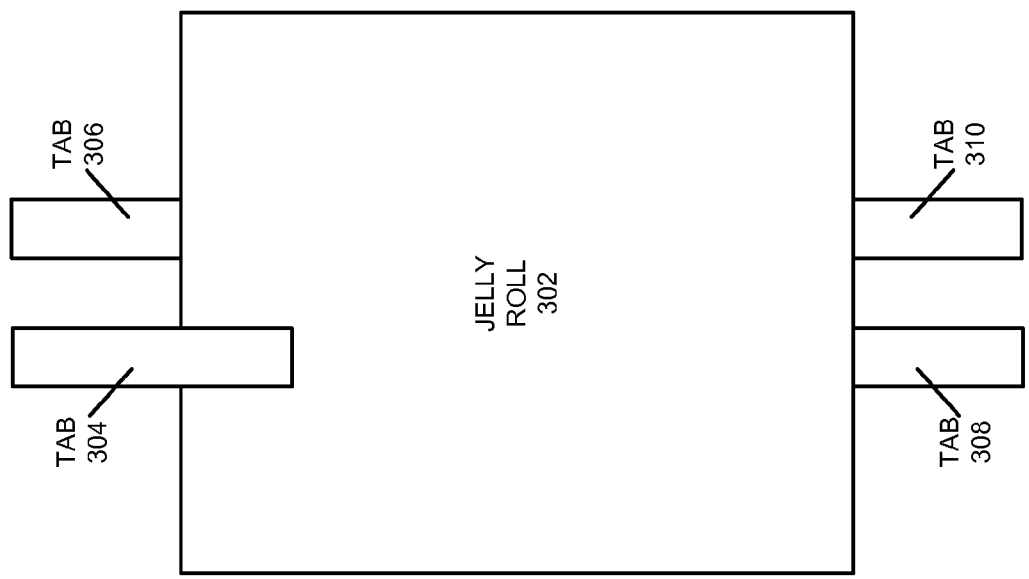
FIG. 3 shows a jelly roll for a battery cell in accordance with the disclosed embodiments.

FIG. 3 shows a jelly roll 302 for a battery cell (e.g., battery cells 100 and 200 of FIGS. 1-2) in accordance with the disclosed embodiments. Jelly roll 302 may include a set of layers which are wound together, including a cathode with an active coating and an anode with an active coating.

In addition, a set of conductive tabs 304-310 may be coupled to the cathode and anode of jelly roll 302. In particular, conductive tabs 304-306 may be coupled to the top of jelly roll 302, and conductive tabs 308-310 may be coupled to the bottom of jelly roll 302. After the battery cell is manufactured, conductive tabs 304-306 may extend through a first side of the battery cell, and conductive tabs 308-310 may extend through a second side of the battery cell that is opposite the first side. For example, conductive tabs 304-306 may extend through a first side seal of the battery cell, and conductive tabs 308-310 may extend through a second side seal of the battery cell.

Conductive tabs 304-310 may further be coupled to the cathode and anode of jelly roll 302 in multiple ways. For example, conductive tabs 304-306 and 308-310 on the same side of jelly roll 302 may be coupled to the same electrode of jelly roll 302. Conversely, each electrode may be coupled to one conductive tab on the top of jelly roll 302 and one conductive tab on the bottom of jelly roll 302.

Those skilled in the art will appreciate that sets of conductive tabs may be coupled to jelly rolls in other configurations. For example, conductive tabs 304-310 may be coupled to orthogonal sides of jelly roll 302 instead of opposite sides of jelly roll 302. Moreover, different sides of jelly roll 302 may be coupled to different numbers of conductive tabs (e.g., conductive tabs 304-310). Such configurations may facilitate the flow of current within the battery cell, the placement of the battery cell in the portable electronic device, and/or the coupling of the battery cell to other battery cells in a battery pack.

Figure 4:
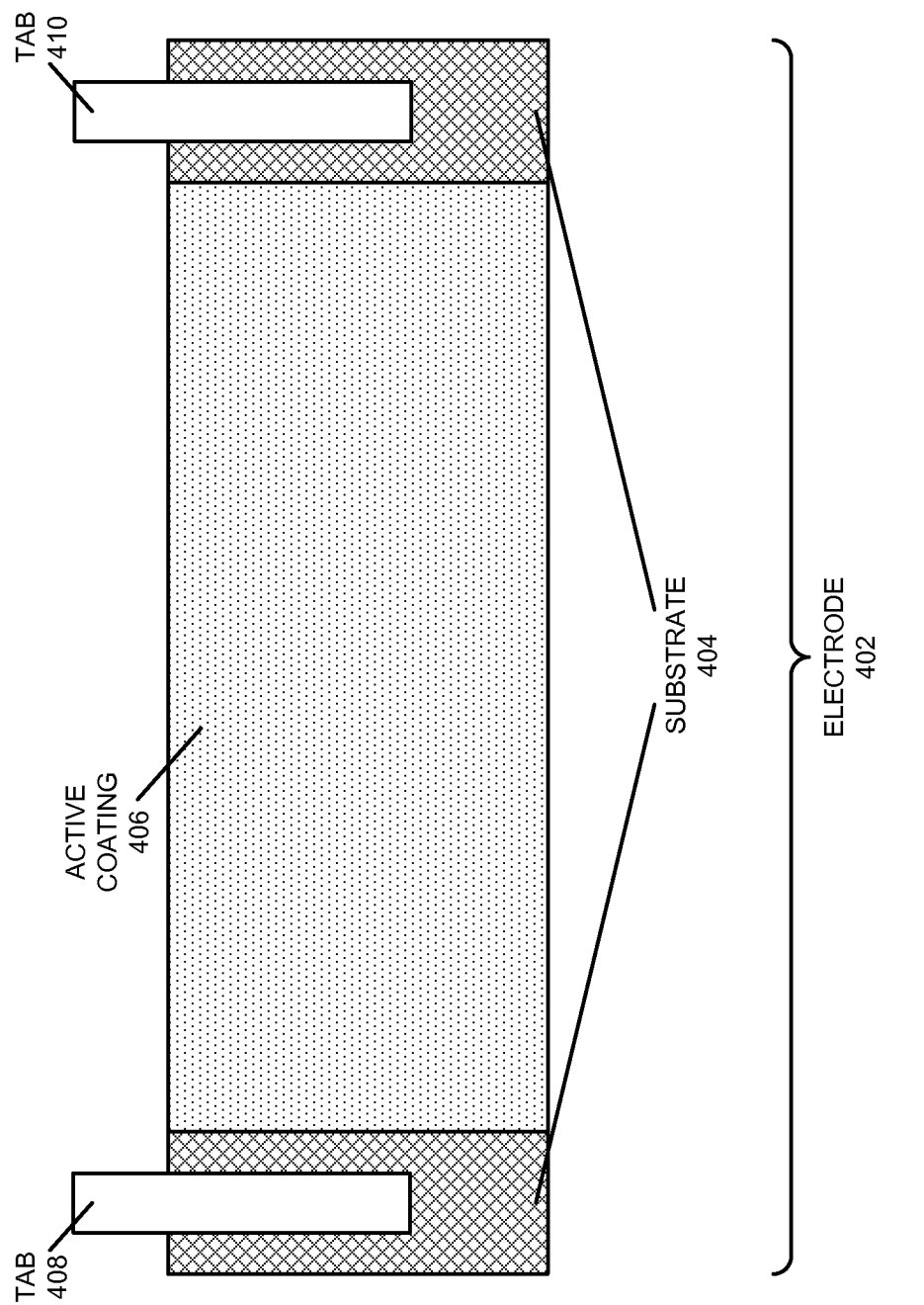
FIG. 4 shows an electrode for a jelly roll in accordance with the disclosed embodiments.

FIG. 4 shows an electrode 402 for a jelly roll (e.g., jelly rolls 102, 202, and 302 of FIGS. 1-3) in accordance with the disclosed embodiments. Electrode 402 may be a cathode or anode for the jelly roll. As shown in FIG. 4, electrode 402 includes a substrate 404 and an active coating 406 disposed over substrate 404. For example, a cathode may include an aluminum substrate 404 with a lithium-based active coating 406 such as lithium cobalt oxide, and an anode may include a copper substrate 404 with a carbon-based active coating 406 such as graphite.

A set of conductive tabs 408-410 may also be coupled to electrode 402. More specifically, conductive tabs 408-410 are coupled to the conductive substrate 404 of electrode 402 to enable the flow of current into and out of electrode 402. As a result, active coating 406 may be omitted from portions (e.g., the ends) of substrate 404 to enable coupling of tabs 408-410 to the portions.

A variety of techniques may be used to omit active coating 406 from substrate 404 prior to coupling conductive tabs 408-410 to substrate 404. First, a mask and/or tape may be overlaid on substrate 404 during application of active coating 406 to prevent active coating 406 from depositing onto the ends of substrate 404. Second, a pattern-coating technique may be used to avoid the deposition of active coating 406 onto the ends of substrate 404. Finally, a solvent may be used to remove active coating 406 from the ends of substrate 404 after active coating 406 is deposited onto substrate 404.

Conductive tabs 408-410 may then be coupled to substrate 404 using a welding technique. For example, ultrasonic welding may be used to couple a set of aluminum conductive tabs 408-410 to a cathode substrate 404 and a set of nickel conductive tabs 408-410 to an anode substrate 404.

The coupling of multiple conductive tabs 408-410 to substrate 404 may increase the current flow in electrode 402. For example, the coupling of conductive tabs 408-410 to different ends of substrate 404 may allow current to flow between the middle of electrode 402 and the ends of electrode 402. On the other hand, the coupling of a single conductive tab to one end of substrate 404 may cause the current to travel across the longest dimension of electrode 402 to flow in and out of electrode 402.

Figure 5:
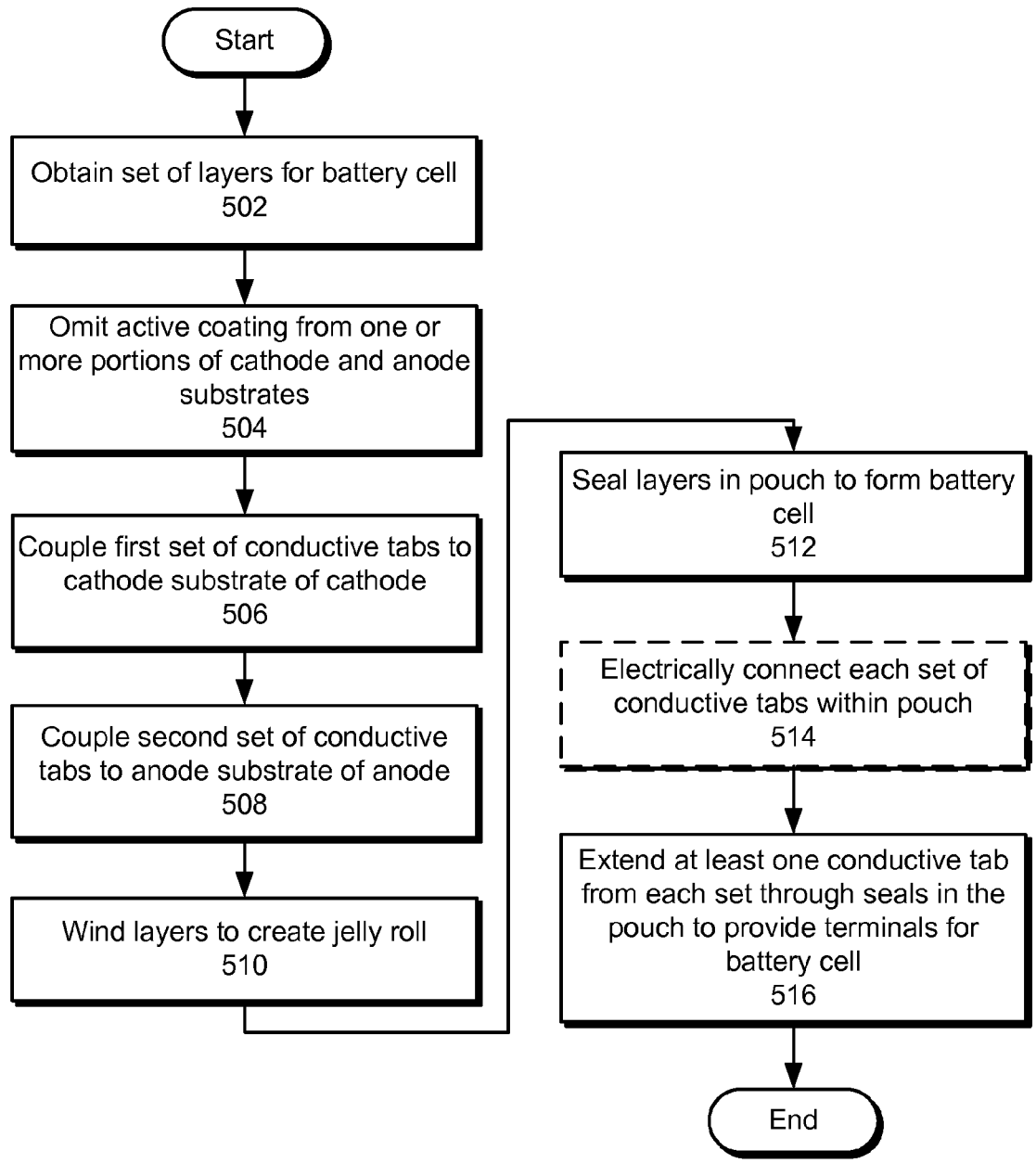
FIG. 5 shows a flowchart illustrating the process of manufacturing a battery cell in accordance with the disclosed embodiments.

FIG. 5 shows a flowchart illustrating the process of manufacturing a battery cell in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a set of layers for the battery cell is obtained (operation 502). The layers may include a cathode with an active coating, a separator, and an anode with an active coating. Next, the active coating is omitted from one or more portions of the cathode and anode substrates (operation 504). The active coating may be omitted using a mask, a solvent, and/or a pattern-coating technique.

The omission of the active coating from the cathode and anode substrates may allow a first set of conductive tabs to be coupled to the cathode substrate (operation 506) and a second set of conductive tabs to be coupled to the anode substrate (operation 508). The first and second sets of conductive tabs may be coupled to the cathode and anode substrates using a welding technique.

In addition, the first and second sets of conductive tabs may be coupled to the substrates in a variety of configurations. First, each set of conductive tabs may include a first conductive tab coupled to a first end of an electrode substrate and a second conductive tab coupled to a second end of the electrode substrate. Second, each set of conductive tabs may include a first conductive tab that extends through a first side of the battery cell and a second conductive tab that extends through a second side of the battery cell. The second side may be opposite the first side or orthogonal to the first side. Third, different numbers of conductive tabs may be coupled to different sides of the substrates. For example, six conductive tabs may be arranged along the length of both the cathode and anode substrates, while two conductive tabs may be arranged along the width of both the cathode and anode substrates.

The layers are then wound to create a jelly roll (operation 510) and sealed in a pouch to form the battery cell (operation 512). For example, the battery cell may be formed by placing the layers into a pouch containing a layer of aluminum and a layer of propylene, filling the pouch with electrolyte, and forming side and terrace seals along the edges of the pouch.

Moreover, each set of conductive tabs may optionally be electrically connected within the pouch (operation 514), and at least one conductive tab from each set of conductive tabs is extended through seals in the pouch to provide terminals for the battery cell (operation 516). For example, one conductive tab from each set of conductive tabs may be extended through the pouch if the set of conductive tabs is electrically connected within the pouch. Conversely, all conductive tabs from the set may be extended through the pouch if the set is electrically connected outside the pouch.

The coupling of multiple conductive tabs to each electrode of the battery cell may increase the current flow in the battery cell. The increased current flow may reduce the voltage drop of the battery cell and increase the use of discharge capacity in the battery cell during a pulse discharge and/or other transient high discharge. For example, a −4 C pulse discharge may not cause the battery cell to reach a 2.8V discharge-termination voltage until 88% of the battery cell's original capacity is used, while the same pulse discharge may cause a conventional battery cell with a single tab per electrode to reach the 2.8V cut-off after only 67% of the conventional battery cell's original capacity is used.

The increased current flow may further facilitate the use of the battery cell with applications that require high pulse currents. For example, the battery cell may support pulse discharges from full-featured and/or high-performance input/output (I/O) devices and/or wireless communications modules.

Figure 6:
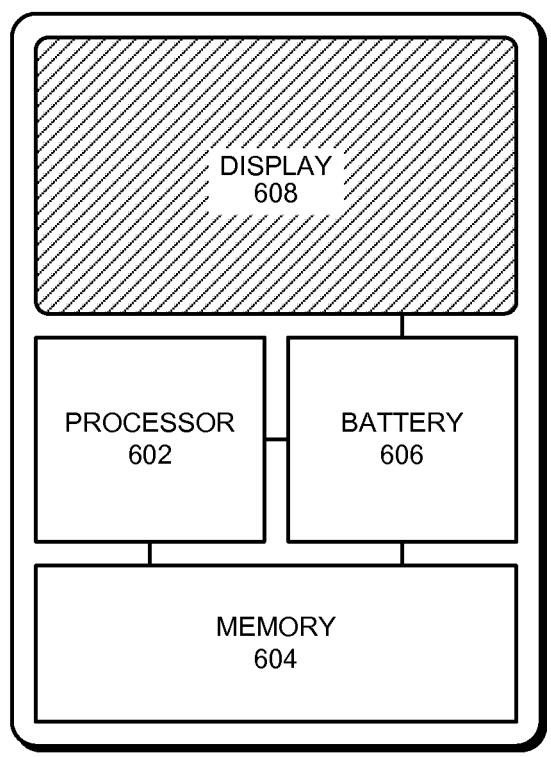
FIG. 6 shows a portable electronic device in accordance with the disclosed embodiments.

The above-described rechargeable battery cell can generally be used in any type of electronic device. For example, FIG. 6 illustrates a portable electronic device 600, which includes a processor 602, a memory 604 and a display 608, which are all powered by a battery 606. Portable electronic device 600 may correspond to a laptop computer, mobile phone, personal digital assistant (PDA), tablet computer, portable media player, digital camera, and/or other type of battery-powered electronic device. Battery 606 may correspond to a battery pack that includes one or more battery cells. Each battery cell may include a set of layers which are wound together to form a jelly roll, including a cathode with an active coating, a separator, and/or an anode with an active coating.

In addition, the battery cell may include a first set of conductive tabs coupled to a cathode substrate of the cathode and a second set of conductive tabs coupled to an anode substrate of the anode. The conductive tabs may increase the current flow in the battery cell and improve the battery cell's transient voltage response to a pulse discharge. In turn, the conductive tabs may increase the discharge capacity of the battery cell during the pulse discharge.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising:
   a jellyroll comprising a set of layers, wherein the set of layers comprises a cathode with a portion having an active coating and a portion without the active coating, a separator, and an anode with a portion having an active coating portion and a portion without the active coating;
   a flexible pouch enclosing the layers;
   a first set of conductive tabs coupled to the portion of the cathode without the active coating;
   a second set of conductive tabs coupled to the portion of the anode without the active coating;
   wherein at least one conductive tab from each of the first and second sets of conductive tabs extends through seals in the pouch to provide terminals for the battery cell.

2. The battery cell of claim 1, wherein each set of conductive tabs is electrically connected within the pouch.

3. The battery cell of claim 1, wherein each set of conductive tabs from the first and second sets of conductive tabs is electrically connected outside the pouch.

4. The battery cell of claim 3, wherein the first and second sets of conductive tabs comprise:
   a first conductive tab extending through a first side of the battery cell; and
   a second conductive tab extending through a second side of the battery cell.

5. The battery cell of claim 4, wherein the second side is opposite the first side.

6. A method for manufacturing a battery cell, comprising:
   winding a set of layers comprising a cathode with a portion having an active coating and a portion without the active coating, a separator, and an anode with a portion having an active coating and a portion without the active coating to create a jelly roll;
   coupling a first set of conductive tabs to the portion of the cathode without the active coating;
   coupling a second set of conductive tabs to the portion of the anode without the active coating; and
   sealing the layers in a flexible pouch to form the battery cell;
   wherein at least one conductive tab from each of the first and second sets of conductive tabs, when the layers are sealed, extends through seals in the pouch to provide terminals for the battery cell.

7. The method of claim 6, further comprising:
   electrically connecting each set of conductive tabs within the pouch.

8. The method of claim 6, wherein a welding technique is used to couple the first and second sets of conductive tabs to the cathode and anode substrates.

9. The method of claim 6, wherein the first and second sets of conductive tabs comprise:
   a first conductive tab extending through a first side of the battery cell; and
   a second conductive tab extending through a second side of the battery cell.

10. A portable electronic device, comprising:
    a set of components powered by a battery pack; and
    the battery pack, comprising:
      a battery cell, comprising:
        a jellyroll comprising a set of layers, wherein the set of layers comprises a cathode with a portion having an active coating and a portion without the active coating, a separator, and an anode with a portion having an active coating and a portion without the active coating;
        a flexible pouch enclosing the layers;
        a first set of conductive tabs coupled to the portion of the cathode without the active coating; and
        a second set of conductive tabs coupled to the portion anode without the active coating;
        wherein at least one conductive tab from each of the first and second sets of conductive tabs extend through seals in the pouch to provide terminals for the battery cell.

11. The portable electronic device of claim 10, wherein each set of conductive tabs is electrically connected within the pouch.

12. The portable electronic device of claim 11, wherein each set of conductive tabs from the first and second sets of conductive tabs is electrically connected outside the pouch.

13. The portable electronic device of claim 12, wherein the first and second sets of conductive tabs comprise:
    a first conductive tab extending through a first side of the battery cell; and
    a second conductive tab extending through a second side of the battery cell.

14. The battery cell of claim 1, wherein at least two conductive tabs from each of the first and second sets of conductive tabs extend through seals in the pouch.

15. The method of claim 6, wherein at least two conductive tabs from each of the first and second sets of conductive tabs, when the layers are sealed, extend through seals in the pouch.

16. The portable electronic device of claim 10, wherein at least two conductive tabs from each of the first and second sets of conductive tabs extend through seals in the pouch.

* * * * *